March 16, 1937.　　A. SHOUP　　2,074,030
TALKING MOTION PICTURE APPARATUS
Filed March 9, 1932　　4 Sheets-Sheet 1

INVENTOR
ALLEN SHOUP
BY
ATTORNEY

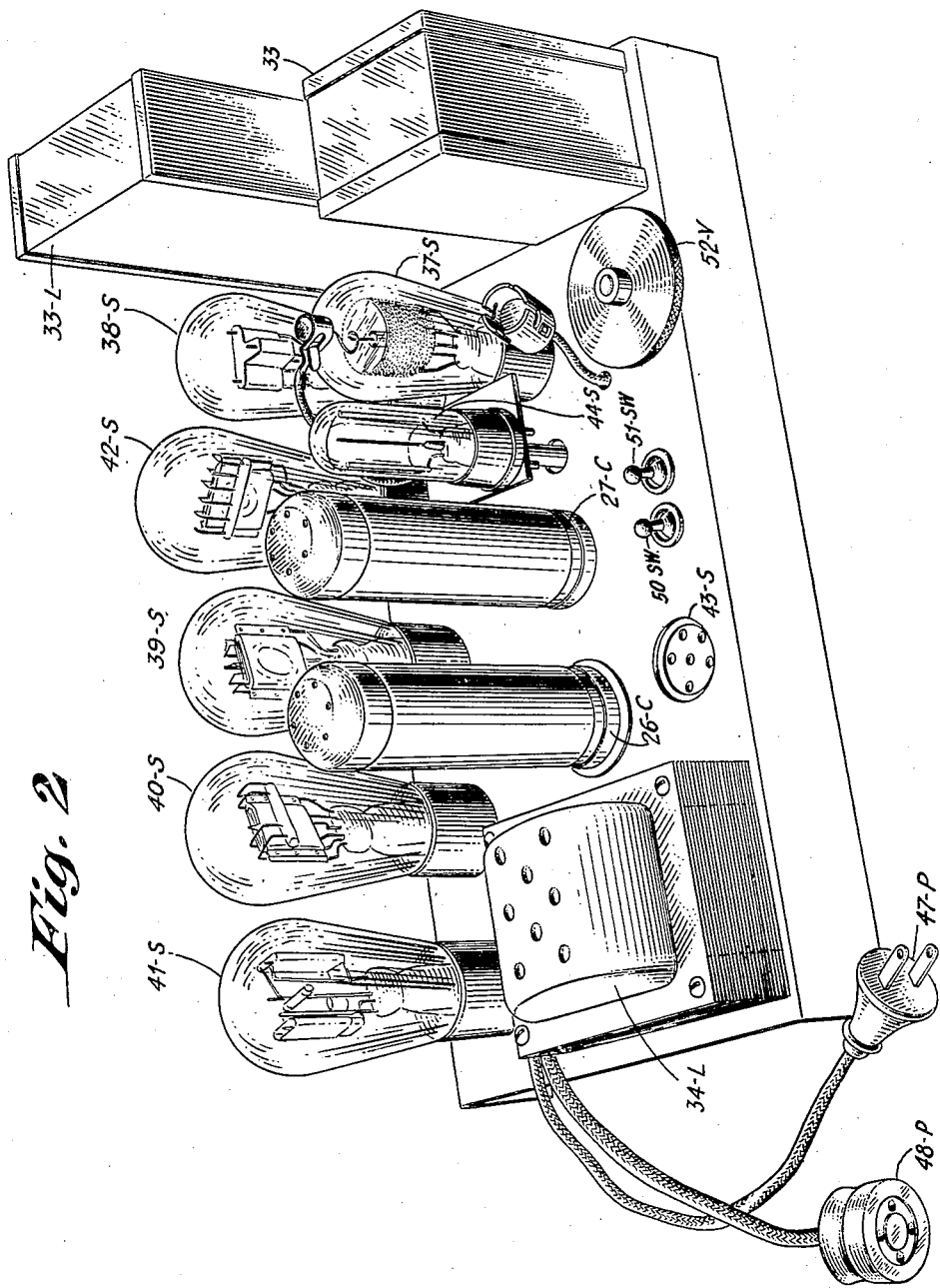

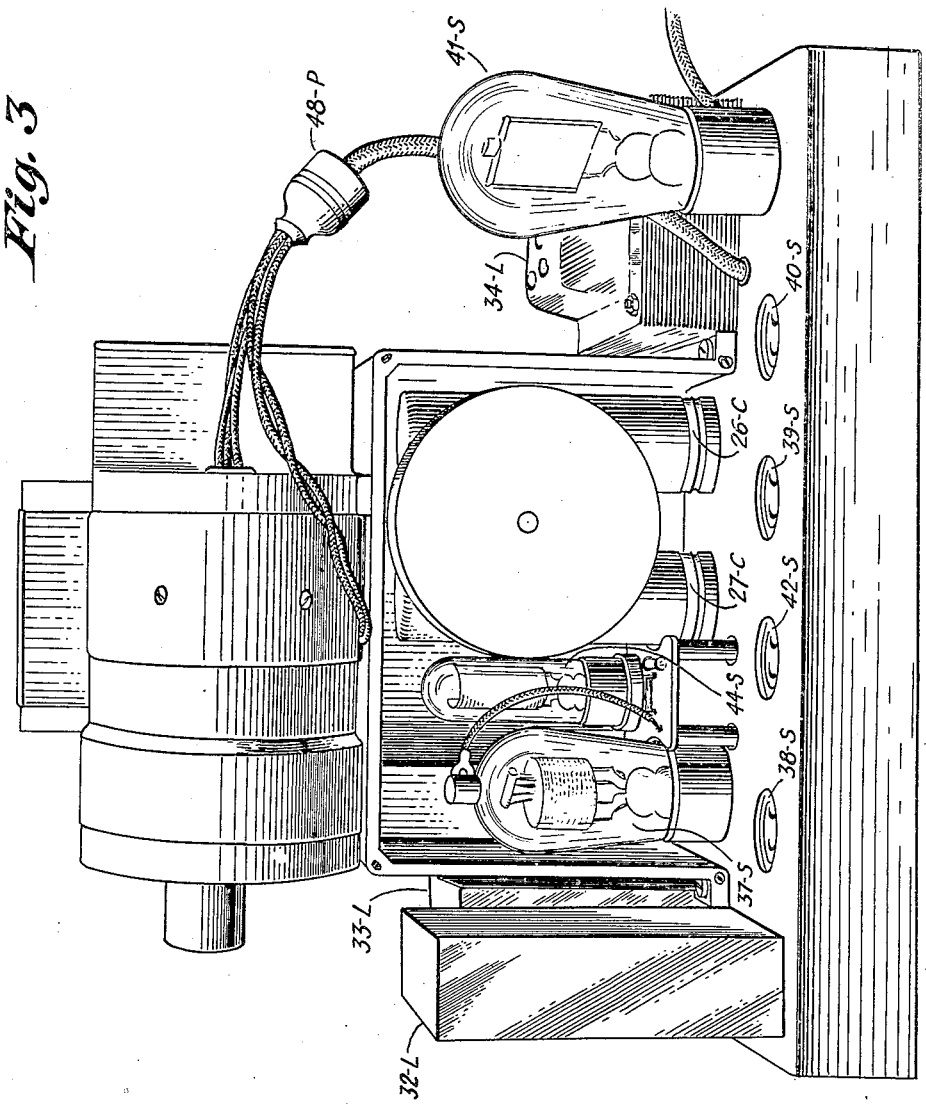

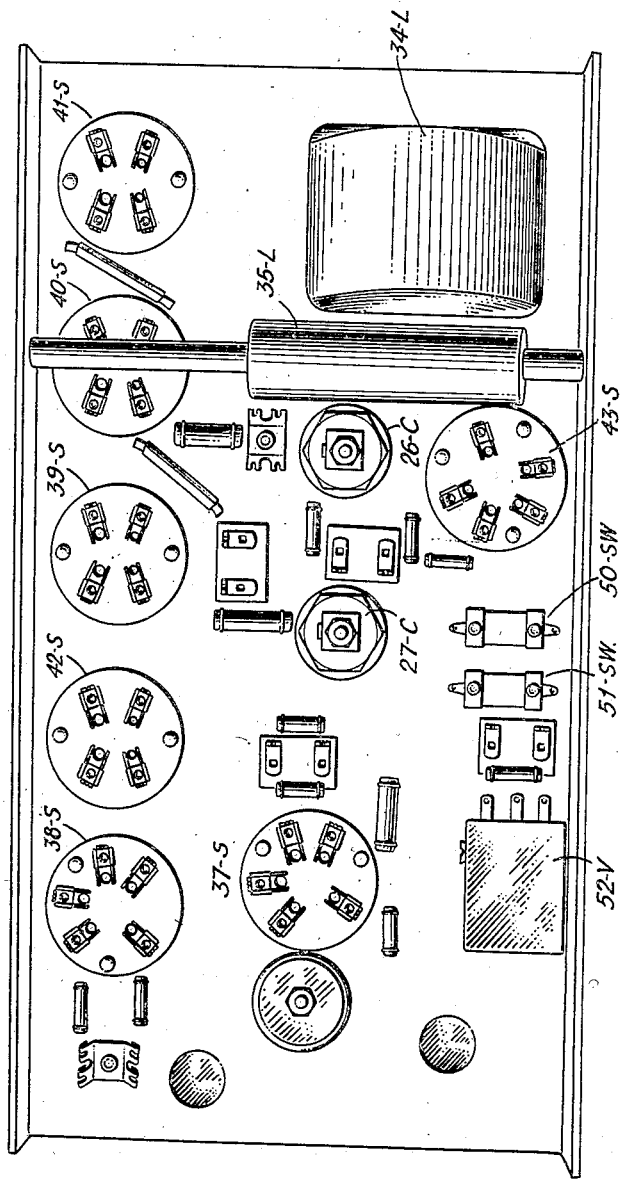

Patented Mar. 16, 1937

2,074,030

UNITED STATES PATENT OFFICE 2,074,030

TALKING MOTION PICTURE APPARATUS

Allen Shoup, Oaklyn, N. J., assignor to Radio Corporation of America, a corporation of Delaware Application March 9, 1932, Serial No. 597,819

5 Claims. (Cl. 179—100.3)

This invention relates to talking motion picture apparatus, and more particularly to circuits and mechanical arrangements of the driving, illuminating, photoelectric, and amplifying apparatus therefor.

The invention provides a novel and compact photoelectric sound pick-up and amplifier embodied in the projector and having a high gain, large power output and flexible volume control, and integral therewith, a novel power-supply for the exciter lamp and novel control means for the projector motor and picture lamp.

One object of the invention is the provision of a novel and improved photocell circuit.

Another object of the invention is the provision of an improved volume control.

Another object of the invention is the provision of a volume control in the photocell circuit.

Another object of the invention is the provision of novel means for preventing any reducing "hum" from the A. C. supply in the amplifier.

Another object of the invention is the provision of current for the exciter lamp of the photoelectric mechanism which, though derived from an A. C. supply, will not introduce "hum" for variations in filament temperature.

Another object of the invention is the provision of means for protecting the amplifier and filter circuits from the application of excessive voltage.

Another object of the invention is the provision of means for controlling the amplifier and loudspeaker concurrently with the projector, whereby the "hum" is rendered less noticeable and proportional to the sound output, and eliminated entirely when the picture is not on the screen.

Another object of the invention is the provision of an amplifier so compact that it can be readily mounted within any desired or convenient portion of the projector mechanism.

Another object of the invention is the provision of a peculiarly compact arrangement of amplifier elements wherein the talking motion picture apparatus itself serves to electrically shield certain elements thereof, while other elements are shielded by the base or "chassis" upon which the entire mechanism is mounted.

Another object of the invention is the mounting of the amplifier in the base which is, for mechanical reasons, provided for the projector without materially increasing the size thereof or interfering in any way with the operation thereof.

Referring now to the drawings:

Fig. 2 is a view of the bottom of the "chassis" showing the arrangement of the various elements thereupon;

Fig. 3 is a view of the amplifier, etc., as mounted upon the "chassis"; and

Fig. 4 is a view of the "chassis" corresponding to Fig. 2 but showing the relation of the projector and sound reproducer thereto and as mounted thereupon.

Figure 1:
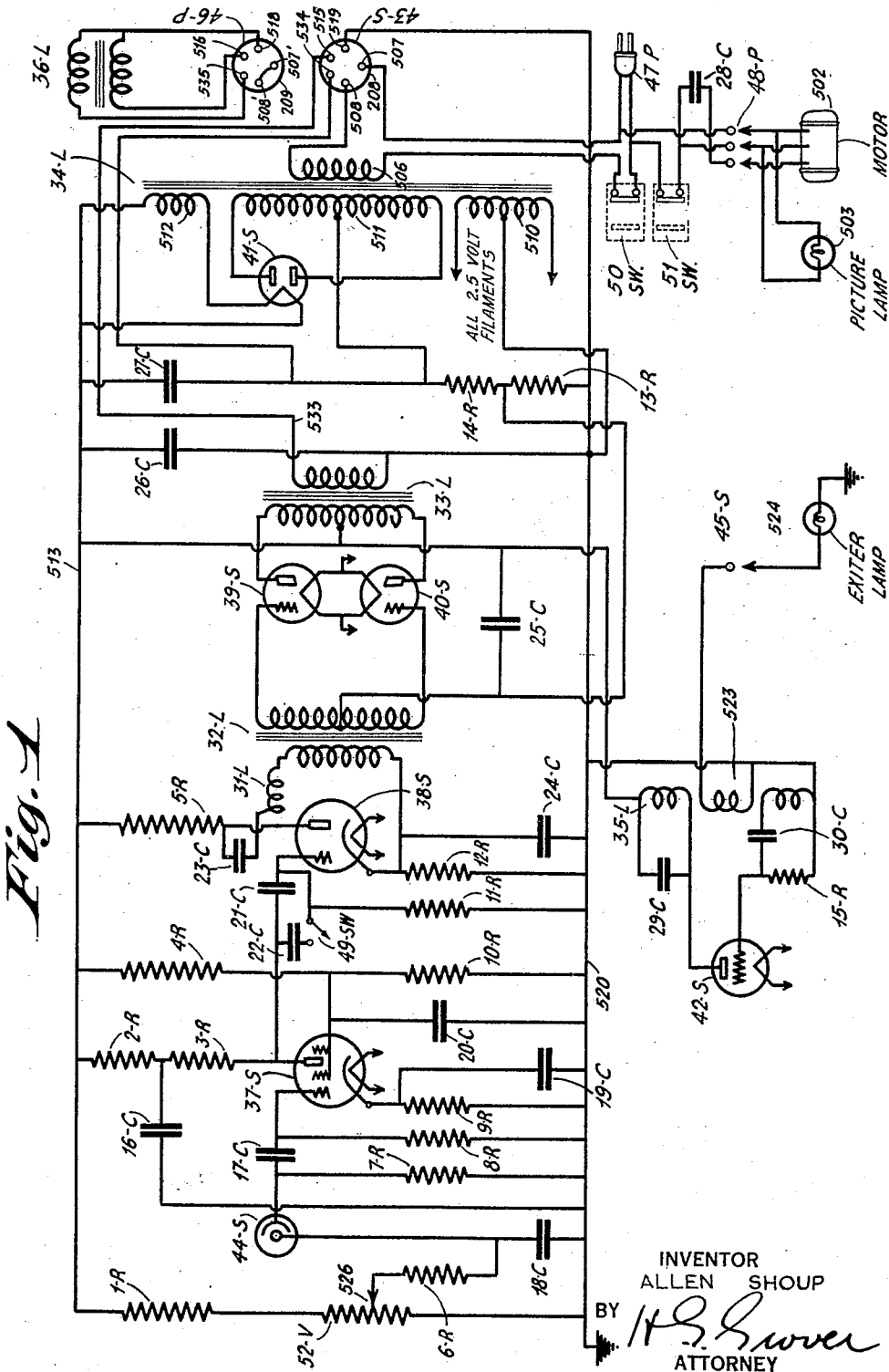
Fig. 1 is a schematic wiring diagram of the apparatus.

The relation of these figures will be readily apparent, and, since similar reference numerals are used in all figures, they will not be specifically hereinafter referred to again except where necessary. The wires have been omitted from Fig. 3, as the connections are apparent from Fig. 1 and their inclusion in Fig. 3 would render it confusing.

In order to render the construction more readily apparent, before proceeding with the detailed description, the values of the various elements are here tabulated:

| | | | |
|---|---|---|---|
| 1—R Resistor | 120000 | ohms | (D) |
| 2—R Do | 50000 | ohms | (D) |
| 3—R Do | 100000 | ohms | (D) |
| 4—R Do | 110000 | ohms | (C) |
| 5—R Do | 70000 | ohms | (C) |
| 6—R Do | 1 meg. | | (D) |
| 7—R Do | 10 meg. | | (D) |
| 8—R Do | 2 meg. | | (D) |
| 9—R Do | 3500 | ohms | (D) |
| 10—R Do | 20000 | ohms | (D) |
| 11—R Do | 1 meg. | | (D) |
| 12—R Do | 5000 | ohms | (D) |
| 13—R Do | 100000 | ohms | (D) |
| 14—R Do | 140000 | ohms | (D) |
| 15—R Do | 80000 | ohms | (C) |
| 16—C Capacitor | .05 | mf. | |
| 17—C Do | 720 | mmf. | |
| 18—C Do | .1 | mf. | |
| 19—C Do | .5 | mf. | |
| 20—C Do | .1 | mf. | |
| 21—C Do | 800 | mmf. | |
| 22—C Do | 4000 | mmf. | |
| 23—C Do | .25 | mf. | |
| 24—C Do | .5 | mf. | |
| 25—C Do | .5 | mf. | |
| 26—C Do | 10 | mf. | |
| 27—C Do | 10 | mf. | |
| 28—C Do | 3.0 | mf. | |
| 29—C Do | 720 | mmf. | |
| 30—C Do | 720 | mmf. | |

31—L Coil

32—L Transf. 4:2 ratio, primary inductance 40 henries.

33—L Transf. 21:2 to 1 ratio, primary inductance 15 henries.

34—L Transf. 720 volts center tapped to rectifier.
35—L Osc. coils approx. 50 mh. in plate and grid.
36—L Speaker
37—S Socket UY—224—A
38—S Do UY—227
39—S Do UX—245
40—S Do UX—245
41—S Do UX—280
42—S Do UX—245
43—S Do UY—Plug
44—S Do UX—868
45—S Do K—30121
46—P Plug speaker
47—P Plug 110-V. A. C. supply
48—P Plug projector
49—SW Tone switch
50—SW Amplifier switch
51—SW Projector switch
52—V Vol-control 100000 ohms Having provided a condensed and specific description of the exact structure of my invention, I will now proceed with a more detailed description of the operation thereof, although it should be definitely understood that I do not consider myself bound by any statement of theory hereinafter given, and believe myself entitled to claim any and all novel features or improvements in the constructions hereinbefore disclosed and any and all improved functions thereof or results flowing therefrom or methods involved therein and previously invented.

*Photocell circuit and volume control*

The photocell circuit shown on K—804426 saves a stage of amplification and employs a volume control which may be mounted on amplifier or at any remote position. It is also very inexpensive; comparatively free from hum or pick-up; practically unlimited in frequency response; and is adaptable to any amplifier which has short connections to photocell, and low hum. (It is necessary to reduce amplification with volume control in some cases to reduce the hum.)

The volume control can be placed at any location without any shielding or shielded wires. Noise from potentiometer is filtered out by 6—R and 18—C.

The circuit is very sensitive due to the high coupling impedance (7—R, 17—C and 8—R), and due to high photocell voltage applied to weak cells, there is less danger of injury to cell with 30 volts more applied to it. The variation of resistors and line voltages are such that it is at present practicable only to design for an average of 80 volts (min. of 70 volts) unless protection is offered to the photocell. The above system employs an average of 110 volts (min. 100 volts). This increases the gain 3 to 4 times. The 11 megs. (6—R and 7—R) protect the cell from glowing. A tendency of the photocell to glow will reduce the voltage. The current can only be 10 micro-amps.; the cell is rated at 20 micro-amps. max. The limiting factor is hiss and unstability of amplifier. The filter (6—R and 18—C) prevents all dangers from "motor boating" or unstability. The hiss is function of photocells and the applied voltage. A very sensitive cell may glow with no protection at 90 volts. With this circuit instead of glow it will be hiss. This sensitive cell would normally be operated below 90 volts, on account of the high sensitivity. But a weak cell would have no hiss at 110 volts, and would act like the sensitive cell in this circuit except that there would be different positions of the volume control setting. The ratio of hiss to output is the same for all cells, and this circuit takes advantage of the production variations of the glow voltage of the cells, and makes the poor cell approach the sensitivity of the good cell.

The present invention also involves a method of reducing hum on a talking picture amplifier. If it were not for this hum balancing system, the amplifier would not only be very costly but also so large that it would be impractical to mount it in the base of the projector. The size and cost of this unit is of great commercial importance.

The total hum on the production amplifiers is .009±25% volt across 15 ohms. This hum is higher than the d- luxe 16 mm. model amplifiers but is better than those which do not have adjustable filament center taps. The hum limit on some of the 35 mm. amplifiers is 0.1 volt, on others 0.5 volt. All of the 35 mm. amplifiers have hum adjustments, and a large filter system.

The system employed is not only free from adjustments, but also light in weight. The 15 henry speaker field is the only inductance in the filter system. It is a hum-balancing scheme, shown by resistor-capacitor network which cancels with all tubes without adjustments.

The hum ripple is fed through 5—R to plate of UY—227 and through 2—R and 3—R to plate of UY224—A. The grid and plate of UY227 are effectively 180° out of phase. The ripple impressed on UY224—A is impressed on grid of UY—227 and finally on the UY—227 plate after being amplified about seven and one half times. This hum will cancel with the ripple through 5—R if they are equal in magnitude. These two ripples can be made equal by a filter (2R and 16—C) which reduces the hum on the grid seven and one half times, before it is amplified seven and one half times.

The above system as is so far explained will reduce the hum to .002 volt by carefully adjusting for a certain UY224—A tube, but may not cancel at all with the next tube. It was found necessary to also tie up the UY—224—A to the balancing system, because the phase and magnitude of the tube ripple varies with different tubes. This hum ripple from the UY—224—A heater is reduced to a minimum by a system similar to the balancing scheme applied to the plate ripple.

The screen grid and the plate of the UY224—A are effectively 180° out of phase. The mu between the screen grid and the plate is about 8. The hum ripple from heater is impressed upon both screen grid and plate. The screen grid ripple voltage depends on values of 20—C (K—804426) and 10—R. If the capacity is large and the resistance small, this pick-up voltage will be small. By proper choice of 20—C and 10—R this voltage can be made to equal one eighth of the voltage picked up on the plate from the heater. If there were no other considerations, the ripple from the heater would cancel, regardless of its phase or magnitude. Actually, ripple from the heater is also picked up by the control grid, and ripple from B+ is fed to the screen grid through 4—R, and in general all the resistors in the tube circuit affect the hum more or less.

The proper values of 2—R, 10—R, 4—R, 9—R, 8—R, 16—C and 20—C were determined experimentally with a large number of tubes. These units and the tubes can vary over wide limits without seriously increasing the hum. The overall hum comes mostly from the UX—245 output tubes, and depends on how they balance without an adjustable center tapped resistor.

There are many similar value of resistors and capacitors that will affect a balance of hum. This same method has been tried by the writer with another stage of amplification. The more the amplification the greater the value of system, because a "brute force" system not only becomes very large and expensive, but also unsaticfactory.

*Protective speaker plug*

When electrolytic capacitors are used it is necessary to have a protective device to prevent over-voltage when the speaker field is removed. The speaker must be disconnected from the projector for every change of set up, so it would be very easy to forget to plug in the speaker. Former protective devices have been quite complicated and expensive.

The system used is shown on Fig. 1. The protection is added for no additional cost. A standard 5 prong socket and plug are employed. Three prongs are used for the speaker and two for 110 volts A. C. When the plug is removed the A. C. power to the amplifier is turned off. The two A. C. plugs should be short so as to control the A. C. first, and kill the voltage across the capacitor before the plug is disconnected.

When the projector and amplifier are combined on one base it is particularly desirable to tie several electrical controls to one mechanical operation. The three methods below have proven to operate very satisfactorily.

1. The "off—on" switch for the motor should be of simple toggle type with a second pole to open the voice coil when the projector is stopped. This kills the hum and other noise when the projector is stopped. When the projector runs these would not be noticed above the ground noise from the film, and the gear noises from the projector. The voice coil may be shorted instead of opened, but this would involve a more expensive switch.

2. The motor switch may be mechanically locked to the volume control. This improves the operation of the photocell, removes a control from both inside and outside of the carrying case, and prevents a dying down effect when the machine coasts to a stop in the middle of a film with the volume "on".

3. A combination of the first two methods. When the projector is off the voice coil is shorted, and the volume is zero. This requires a double-pole single-throw switch mechanically tied to the volume control shaft.

There have been heretofore several methods of supplying exciter lamps from A. C. lines. The radio frequency method is the only one to date which is portable, and free from hum. The price is considerably less than even those methods which have hum. It is particularly advantageous for the 4 volt ¾ amp. lamp with a slitless optical system especially when it can be incorporated in the design of the amplifier without increasing the amplifier cost.

The theoretical proposition of high-frequency excitation of the exciter lamp may (or may not) be old, but applicant believes that he is the first to invent apparatus which is capable of any useful application of this idea. Applicant's invention involves, among other things:

1. Using the lowest possible inaudible frequency to allow easy transmission, and prevent "pick up".

2. Supplying power for the oscillator from the amplifier and mounting the entire unit in the base of the projector.

3. Use of a small low-priced tube, such as the UX—245.

4. Using a design which is very efficient, and does not draw enough power from the power supply to involve an additional expense.

5. Mechanical design of the oscillator coil to accomplish several very desirable electrical features.

*Mounting of amplifier system in base of projector*

The general practice is to mount an amplifier on one (or more) base and the projector on another. Since the photocell is of very high impedance (about 100,000,000 ohms) it is not possible to transmit economically and efficiently unless the photocell is mounted on the amplifier. Others have mounted part of the amplifier on the projector; but the applicant proposes to mount the photocell, voltage amplifier, power amplifier, exciter lamp supply, projector switches and capacitors, etc., all in the base of the projector.

The system has the following advantages:

1. It saves a base, and saves a carrying case.
2. It eliminates plug connections between the photocell and the amplifier,—the photocell is mounted on the amplifier and permanently wired up with low losses, whereas other methods either involve transformers and plugs, or many wires and shielding.
3. It saves shielding. The projector casting serves as an excellent shield for all the items which need shielding; to wit: photocell, NY 224—A, and electrolytic condenser.
4. It relieves the projector from considerable wiring, switches, capacitors for motor, etc.
5. There is a general saving in weight, space, and cost.

The exciter lamp circuit is as heretofore described, designed to operate at approximately 15,000 cycles, and I believe myself to be the first to use a frequency for such purpose which is above a frequency audibly impressed upon the photocell and at the same time below such frequencies as invoke difficulty in transmission.

It may well be that I have not specifically heretofore described all the advantageous or novel features of my invention as shown and described; nevertheless I believe myself entitled to claim not only the specific constructions disclosed and the method of operation thereof.

I claim:

1. In talking motion picture apparatus including an incandescent filament exciter lamp and a photocell adapted to mutually cooperate with a sound record of varying light transmission, an amplifier connected to said photocell, an oscillator connected to said exciter lamp, and common power-supply means connected to said amplifier and said oscillator.

2. In talking motion picture apparatus including an incandescent filament exciter lamp and a photocell adapted to mutually cooperate with a sound record of varying light transmission, an amplifier connected to said photocell, an oscillator operating at a super-audible frequency connected to said exciter lamp, and common power-supply means connected to said amplifier and said oscillator.

3. Talking motion picture apparatus including a motion picture projector and a sound reproducer constituting the base of the said projector, the said sound reproducer including an exciter lamp for optically scanning a soundtrack on film passed through said projector, a photocell for converting variations in the scanning light into electrical impulses, means for controlling the voltage applied to the photocell whereby the volume of output is controlled, means coupling the cathode of the photo cell to the grid of an amplifying tube, means comprising a portion of the said projector for electrically shielding said photo cell and amplifying tube, a dynamic loudspeaker connected to said apparatus and A. C. power supply for the said amplifier, a rectifier and filter for converting the A. C. power supply into D. C., the field magnet of the said loudspeaker being in the said filter circuit, means for simultaneously disconnecting said loudspeaker and the said A. C. power supply, ann an oscillator connected to the power supply of the said amplifier for operating the said exciter lamp, the circuit from said filter to said amplifier including hum-balancing resistor for eliminating residual A. C. hum.

4. In talking motion picture apparatus, an amplifier, an exciter lamp of the incandescent filament type, an oscillator for operating said exciter lamp, and a common rectifier and filter for actuating said amplifier and said oscillator from a source of alternating current.

5. Talking motion picture apparatus including and A. C. power supply, a dynamic loudspeaker adapted to be located remote from the remainder of the apparatus, means connecting the field magnet of the loudspeaker to the filter circuit of the A. C. power supply, and a plug connecting said connecting means to the apparatus, and including means for disconnecting said loudspeaker and the supply means of said power supply.

ALLEN SHOUP.